United States Patent [19]

Brandt, Jr. et al.

[11] 4,051,792
[45] Oct. 4, 1977

[54] STRUCTURAL ORIENTATION AND PROTECTIVE APPARATUS FOR TILLAGE ASSEMBLY

[75] Inventors: Henry William Brandt, Jr., Des Moines; Donald Thomas Sorlie, Ankeny, both of Iowa

[73] Assignee: Deere & Company, Moline, Ill.

[21] Appl. No.: 649,278

[22] Filed: Jan. 15, 1976

[51] Int. Cl.² ............................................. A01C 5/00
[52] U.S. Cl. .................................... 111/85; 111/87; 172/68; 172/71; 172/120; 172/392; 172/764
[58] Field of Search ................... 111/1, 17, 22, 14, 60, 111/61, 69, 52, 85, 62, 86, 87, 66, 88, 63; 172/188, 387, 392, 393, 764, 727, 681, 518, 582, 19, 519, 538, 536, 557, 671, 674, 669, 548, 574, 47, 378, 697, 60, 556, 68, 71, 120

[56] References Cited

U.S. PATENT DOCUMENTS

| | | | |
|---|---|---|---|
| 377,222 | 1/1888 | Arnett | 172/387 |
| 610,316 | 9/1898 | Arnett | 111/87 |
| 627,830 | 6/1899 | Rodenberger | 111/84 |
| 930,846 | 8/1909 | Dean | 172/19 X |
| 1,428,973 | 9/1922 | Northon | 172/387 X |
| 1,696,562 | 12/1928 | Allen | 111/63 |
| 1,747,525 | 2/1930 | Nagy | 172/393 |
| 2,961,981 | 11/1960 | Sooter | 111/85 |
| 3,087,444 | 4/1963 | Ferguson et al. | 111/85 |
| 3,202,221 | 8/1965 | Monk et al. | 172/63 |

FOREIGN PATENT DOCUMENTS

1,098,018  1/1968  United Kingdom .................. 111/87

*Primary Examiner*—Edward M. Coven
*Assistant Examiner*—James R. Feyrer

[57] ABSTRACT

A structural orientation and protective apparatus is disclosed that is particularly useful in a tillage assembly for sod seeding purposes. The apparatus includes a pair of skids each of which is adjacent to a cutter wheel mounted on the tillage assembly for cutting a furrow in ground to be seeded, each skid including a ground engaging portion to determine the maximum depth of furrow cut by the cutter wheel. Each skid is mounted for pivotal motion about a horizontal axis at the forward end, with the forward end being inclined upwardly from the ground engaging portion. A vertical mounting plate on each skid has a bracket mounted therebetween at the rear portion to receive a vertical adjustment rod, one portion of which is connected to the frame of the apparatus for controlling the selected depth of furrow to be cut. A seed tube boot is fastened to the rear portion of the skid so that regardless of the selected depth of furrow cut, the tube remains in the same position relative to the ground. The particular positioning of the seed boot on the skid, as well as the particular structure of the skid itself, protects the seed boot against foreign objects that could damage or otherwise impair proper functioning of the seed boot.

8 Claims, 4 Drawing Figures

STRUCTURAL ORIENTATION AND PROTECTIVE APPARATUS FOR TILLAGE ASSEMBLY

FIELD OF THE INVENTION

This invention relates to orientation and protective apparatus and, more particularly, relates to such apparatus as a part of a tillage assembly.

BACKGROUND OF THE INVENTION

The use of tillage apparatus is well known, and various types of apparatus have been developed that are useful for one or more tasks.

As such apparatus has been developed and utilized, it has become evident that such apparatus can be improved, particularly for the many different tasks to be accomplished. It has been discovered, for example, that conventional tillage apparatus, such as disc harrows, disc cultivators and rotating hoes, have not proved to be entirely suitable for preparing ground for seeding when legumes are to be grown in established grass sod.

For growing legumes in an established grass sod, the ground surface is often uneven and rocky and may have grass swards of differing thicknesses thereon. To prepare such ground for seeding or grassland renovation, it is desirable that the number of trips that an implement must make over such ground be held to a minimum in order to accomplish such tasks as tilling, seeding, cultipacking and spraying of herbicides. Hence, an implement capable of performing all of the necessary tasks in succession during a single pass over the ground was needed.

Such an implement would preferably be towed, since this allows the tillage apparatus to be disconnected from the tractor in order to release the tractor for other uses, and, where towed, the engine of the towing tractor is commonly used for power, as shown, for example, by the patent to Kaller, U.S. Pat. No. 2,957,529.

Responding to this need, apparatus has heretofore been developed having a capability for opening a furrow, depositing seed in the furrow, packing the seed, and spraying chemicals on the planted area. Examples of such apparatus for carrying out some or all of the various tasks can be found, for example, in U.S. Pat. Nos. 2,685,243; 2,734,439; 3,491,709; 3,566,813; 3,568,613; 3,604,515; 3,611,956; 3,673,970; 3,701,327; 3,749,035 and 3,866,552.

Cutting of the sward and sod mat and providing a furrow therein has, however, proved to be a continuing problem, at least in some instances, including problems of controlling the depth and/or width of the furrow and the associated problem of protecting the seed tube and maintaining the same in a constant relationship with respect to the ground regardless of adjustment of the depth of the furrow to be cut by the cutting wheel.

SUMMARY OF THE INVENTION

This invention provides an improved orientation and protective device for a tillage apparatus that is suitable for adjusting the depth if the furrow to be cut by a cutting wheel while maintaining the seed tube in the same position relative to the ground and for protecting the seed tube due to the positioning of the tube and the structure of the skids upon which the seed tube is mounted.

It is therefore an object of this invention to provide an improved orientation and protective device for tillage apparatus.

It is another object of this invention to provide an improved orientation and protective device for enabling adjustment of the depth of a furrow to be cut.

It is still another object of this invention to provide an improved orientation and protective device for maintaining a seed tube boot in the same position relative to ground regardless of the adjustment of the depth of furrow to be cut.

It is yet another object of this invention to provide an improved orientation and protective device for protecting the seed tube boot.

It is still another object of this invention to provide an improved orientation and protective device for providing a skid upon which a cutter wheel and seed tube are mounted.

It is yet another object of this invention to provide an improved orientation and protective device for providing a skid to protect a seed tube boot mounted thereon.

With these and other objects in view which will become apparent to one skilled in the art as the description proceeds, this invention resides in the novel construction, combination, and arrangement of parts substantially as hereinafter described and more particularly defined by the appended claims, it being understood that changes in the precise embodiment of the herein disclosed invention are meant to be included as coming within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
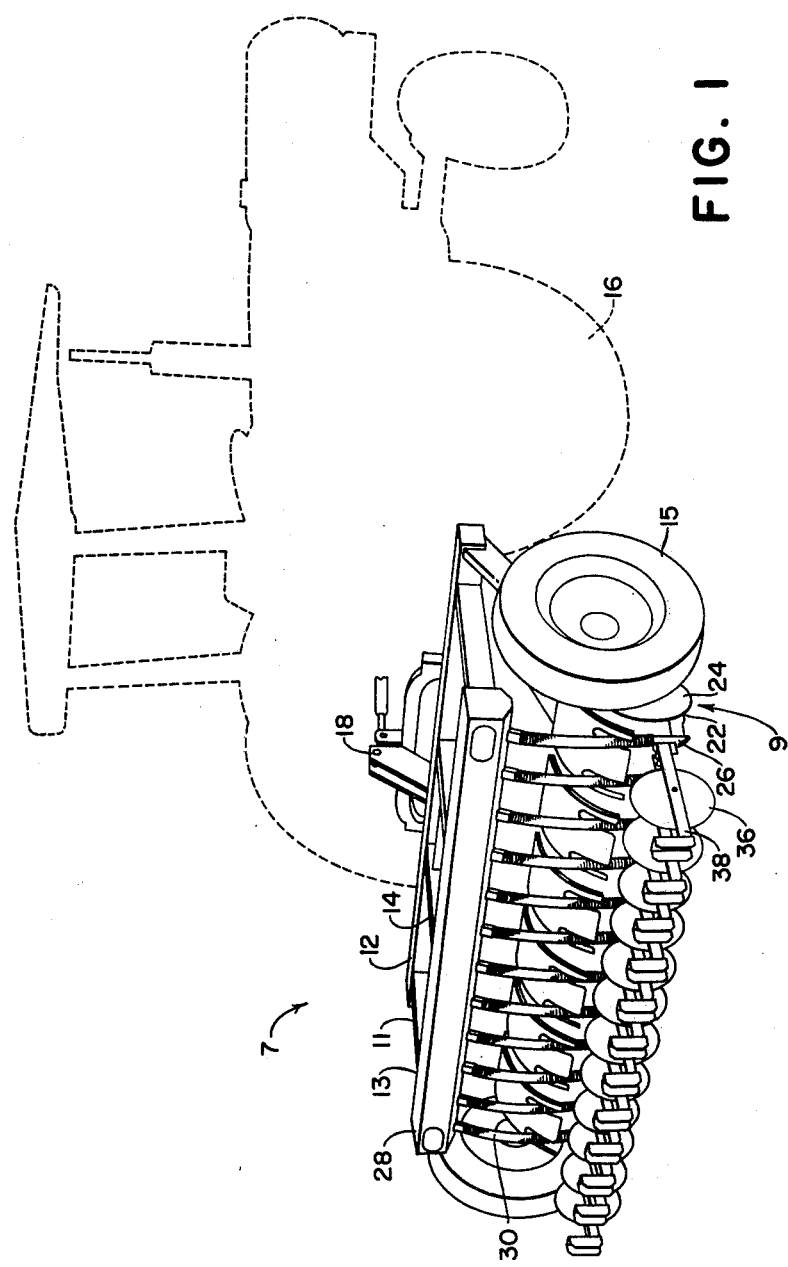
FIG. 1 is a perspective view of the tillage apparatus of this invention with the improved orientation and protective device of this invention mounted thereon.

Referring now to the drawings, FIG. 1 shows a tillage apparatus 7 that includes the improved orientation and protective device 9 of this invention. As shown, apparatus 7 conventionally includes a tool bar or frame means 11 with elongated members 12 and 13 having cross braces 14 at suitable locations. Gauge wheels 15 connected with the frame means may also be provided. A tractor 16 is provided to tow the apparatus (or alternately, it could be self-propelled, if desired) and power from the tractor is conventionally coupled to the apparatus, as, for example, through shafts connected to universal joints between the power take-off of the tractor and a gear box mounted on the apparatus. When towed, the apparatus is conventionally attached to the tractor as by a conventional three-point hitch 18 as indicated in FIG. 1.

Figure 2:
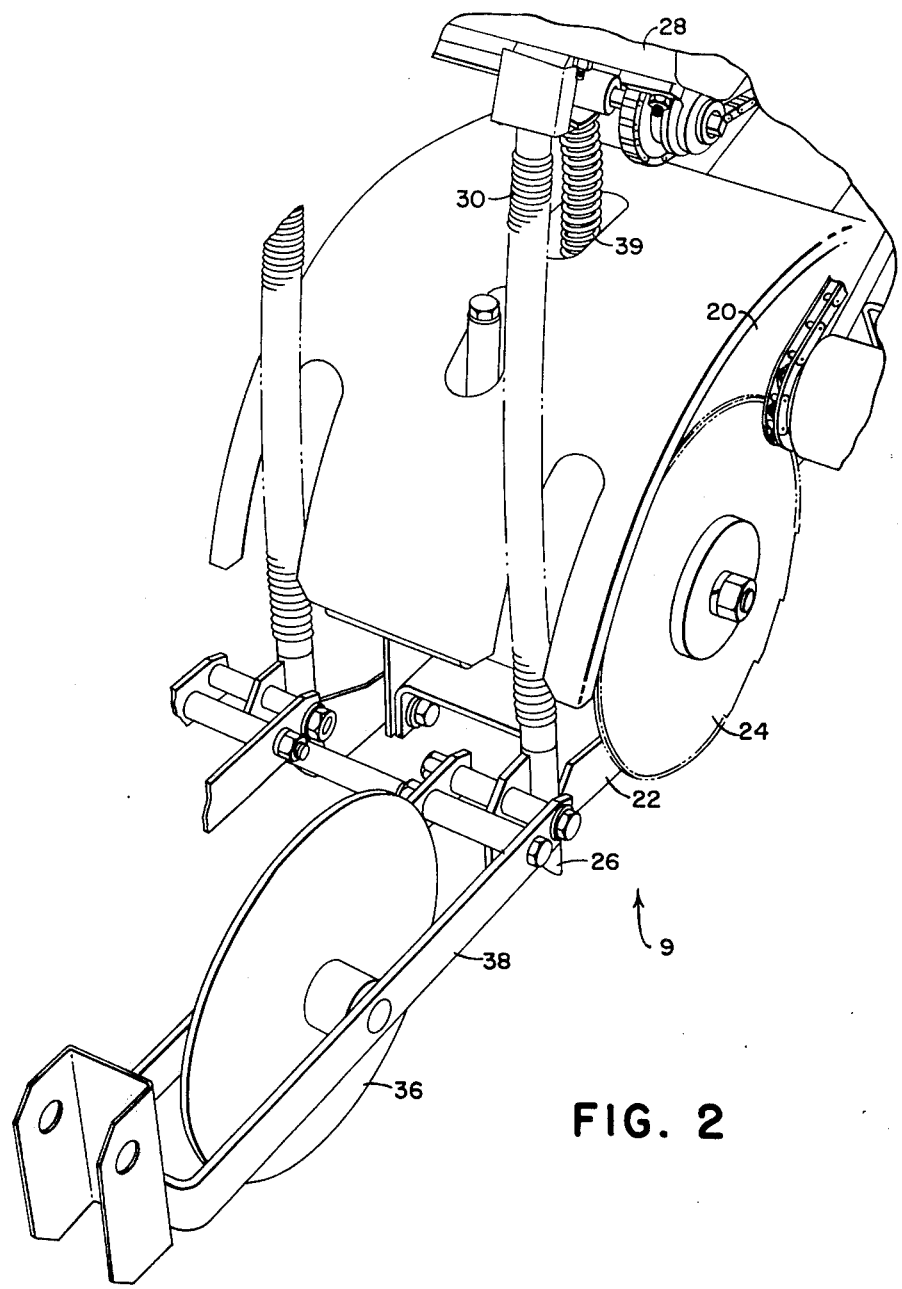
FIG. 2 is a perspective view of the skid means, including a pair of skids each having a seed tube boot mounted thereon according to this invention and shown associated with a cutter wheel for determining the depth of the furrow to be cut.

As also shown in FIG. 2, the frame means supports a plurality of pivoted arms 20 each of which has mounted thereon one or more skids 22 of the orientation and protective device 9 of this invention. One or more cutter wheels 24 are connected with each arm 20 so as to be adjacent to a skid 22, and a seed boot 26 is mounted on each skid adjacent to and rearwardly of each cutter wheel 24. Seed boots 26 are connected to a seed hopper 28 through tubing 30 and a conventional seed metering unit (not shown). As shown, a packer wheel 36 may be mounted rearwardly of skid 22 by means of a bracket 38 so that the packer wheel preferably follows the furrow cut by the cutter wheel and packs seed therein. As indicated, each cutter wheel arm 20 is preferably biased downwardly, as by spring 39, to urge the skid into ground contact during movement of the apparatus by the tractor (when towed).

The foregoing structure has been only briefly discussed herein to the extent deemed necessary to provide a structural setting to better explain the improvements of this invention. The overall combination of a cutter, seeding tube, and packer are shown, for example, in U.S. Pat. Nos. 3,611,956; 3,749,035 and 3,866,552 and may be referred to for a more complete general description.

Figure 3:
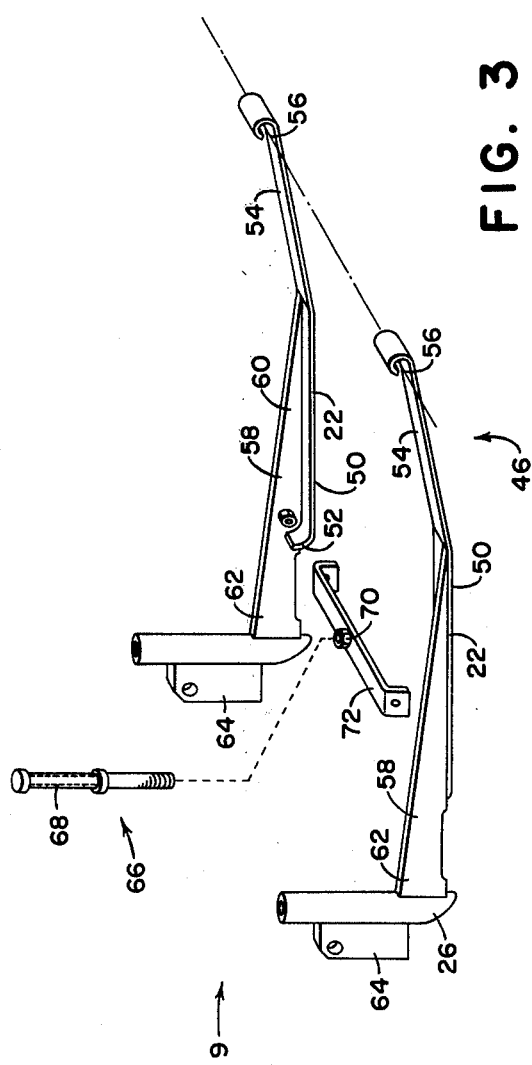
FIG. 3 is an exploded view of the skid means of FIG. 2 showing the depth adjustment means for the skid.
Figure 4:
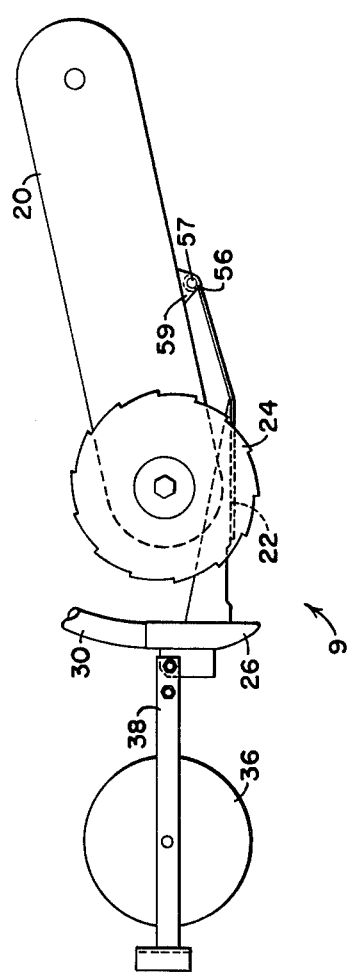
FIG. 4 is a side view of a cutter wheel assembly that includes the cutter wheel, its arm support, skids, seed tube and packer wheel.

As shown in FIG. 3, the orientation and protective device 9 includes skid unit 46 that includes a pair of skids 22 each of which has a ground engaging portion 50 that is substantially flat and horizontally positioned when in normal operating position. Ground-engaging portion 50 terminates in an upwardly-curved flange portion 52 at the rear edge and is integrally connected to an upwardly and forwardly inclined portion 54 that terminates in a hook (or eye) portion 56 suitable for receiving a rod 57 mounted on suitable brackets 59 fixed in depending relation on arm 20 for allowing the skid to pivot about a horizontal axis.

An upstanding vertical mounting bracket 58 is fastened to one side of the ground engaging portion of the skid, with the bracket having a generally triangularly shaped front portion 60 and a generally rectangular rear portion 62, the rear edge of which has the seed tube boot 26 attached thereto with the discharge end of the seed tube boot terminating near the lower edge of the mounting bracket but above the lower edge of the ground engaging portion 50 of each skid. Bracket 58 is preferably mounted outwardly from front to back so that the seed tube boot is slightly behind the cutter wheel to deposit seed in the furrow made by the cutter wheel. The seed tube boot 26 has a flange 64 extending rearwardly therefrom for connection to other apparatus, as, for example, packer wheel assembly 36.

A depth adjusting assembly 66 is positioned at the rear of the skid means and includes vertically positioned depth control rod 68, which is threaded at the lower end and received into an internally threaded sleeve or nut 70 centrally mounted on a U-shaped bracket 72, with the opposite sides of the bracket being fastened to the rear portion of upstanding mounting bracket 58 of skid assembly 46. Rod 68 is connected at the upper portion with the arm 20 to cause the skid assembly to be pivoted upon adjustment of the rod by rotating the same.

In operation, the depth of a furrow to be cut is established by adjustment of depth control rod 68. This causes the skid to pivot about pivot 56 to raise or lower the cutter wheel. However, since the seed tube is fastened to the skid, the positioning of the seed tube boot with respect to the ground will remain substantially the same regardless of the depth of cut selected. In addition, due to the positioning of the seed tube boot at the rear of the skid, and due to the structure of the skid itself, the seed tube boot is protected against obstructions, such as roots and rocks, as well as avoiding a trash buildup or breaking down of the walls of the cut furrow.

As can be seen from the foregoing, this invention provides an improved orientation and protective device that is well suited for use as a part of a tillage assembly. Hence, the invention is not to be considered as being limited to the particular details given, nor to the specific application to which reference has been made during the description of the apparatus, except insofar as may be required by the scope of the appended claims.

What is claimed is:

1. In a tillage unit having a cutter wheel mounted thereon, a structural orientation and protective apparatus, comprising:
   skid means mounted on the unit independently of and adjacent to said cutter wheel of said tillage unit to control the depth of a furrow cut by said wheels;
   seed tube means having a seed boot rearwardly spaced from the cutter wheel with a discharge portion rigidly connected to a rearwardly extending portion of said skid means in a manner such that said seed boot is vertically aligned with the furrow and protected by said skid means against foreign matter, said seed tube means being adapted to deposit seed in a cut furrow; and
   depth adjustment means connected to said skid means for selectively adjusting the depth of furrow cut by vertically adjusting the cutter wheel and skid means relative to one another while said discharge portion of said seed boot is maintained in substantially the same relative position with respect to the ground level regardless of the selected depth of furrow cut.

2. The structural orientation and protective apparatus of claim 1, wherein the rear portion of said skid means is connected with said depth adjustment means.

3. The structural orientation and protective apparatus of claim 1, wherein said depth adjustment means includes a threaded vertical rod that is received in a U-shaped bracket connected with said skid means to thereby permit adjustment of the depth of a furrow cut by a cutter wheel adjacent to said skid means.

4. The structural orientation and protective apparatus of claim 1, wherein said skid means includes at least one skid having a generally flat and horizontally positioned ground engaging portion and an upwardly inclined forward portion.

5. The structural orientation and protective apparatus of claim 4, wherein said skid means includes a pair of spaced skids each of which is associated with separate cutter wheels mounted on said tillage unit.

6. In a tillage unit having a cutter wheel mounted thereon and rotatively driven, a structural orientation and protective apparatus, comprising:
   skid means including a pair of spaced skids mounted on the tillage unit independently of and adjacent to said cutter wheel of said tillage unit to control the maximum depth of a furrow cut by said wheel when rotated, each said skid means including a generally flat and horizontally positioned ground engaging portion, an upwardly inclined front portion and a vertically positioned mounting plate the bottom portion of which is connected to said ground engaging portion;
   a seed boot rearwardly of the wheel and fixedly connected to said mounting plate at the rear portion thereof in a manner such that said seed boot is vertically aligned with the furrow and protected by said skid means against foreign matter; and depth adjustment means for selectively adjusting the depth of furrow cut by vertically adjusting the skid means and cutter wheel relative to one another, said depth adjusting means including a vertical adjustment rod and U-shaped bracket connected with the rear portion of said mounting plate of each said skid so that the depth of a furrow to be cut may be adjusted while at the same time maintaining said seed boot in substantially the same position relative to the ground regardless of the selected depth of the furrow to be cut.

7. The structural orientation and protective apparatus of claim 6, wherein the upwardly inclined front portion of each said skid terminates in a curled portion adapted to provide a pivot about which said skid may be pivoted as a part of said selected depth adjustment.

8. The structural orientation and protective apparatus of claim 6, wherein each said mounting plate includes a generally triangular portion connected with said ground engaging portion and a generally rectangular portion the back of which has said seed boot mounted thereon with the discharge portion of said seed boot being adjacent to the lower edge of said rectangular portion but terminating above the lower edge of said ground engaging portion of said skid means.

* * * * *

UNITED STATES PATENT OFFICE
CERTIFICATE OF CORRECTION

Patent No. 4,051,792    Dated 4 October 1977

Inventor(s) Henry William Brandt, Jr. and Donald Thomas Sorlie

It is certified that error appears in the above-identified patent and that said Letters Patent are hereby corrected as shown below:

Column 4, line 18, delete "wheels" and insert --wheel--.

Signed and Sealed this

Second Day of May 1978

[SEAL]

Attest:

RUTH C. MASON
Attesting Officer

LUTRELLE F. PARKER
Acting Commissioner of Patents and Trademarks